United States Patent [19]

Russell

[11] 4,309,686
[45] Jan. 5, 1982

[54] CARBON STRAIN GAGE

[76] Inventor: John D. Russell, 26878 Sea Vista Dr., Malibu, Calif. 90265

[21] Appl. No.: 116,144

[22] Filed: Jan. 28, 1980

[51] Int. Cl.³ .............................................. G01L 1/22
[52] U.S. Cl. .......................................... 338/2; 338/6
[58] Field of Search ............... 338/2, 3, 6; 29/610 SG

[56] References Cited

U.S. PATENT DOCUMENTS 3,105,139 9/1963 Russell ....................... 29/610 SG X
3,245,018 4/1966 Russell ................................. 338/3 X Primary Examiner—C. L. Albritton
Attorney, Agent, or Firm—Mawhinney & Mawhinney & Connors

[57] ABSTRACT

This invention relates to improvements in weldable strain gages of the type comprising a strain-sensing filament mechanically coupled to a strain-deformable housing. In a preferred embodiment of the invention, the strain-sensing filament comprises a carbon strand.

3 Claims, 3 Drawing Figures

CARBON STRAIN GAGE

BACKGROUND OF THE INVENTION

This invention relates to improvements in strain gages for measuring strain in a body subjected to variable stress and, more particularly, to strain gages of the type comprising a strain-responsive filament coupled to a strain-deformable housing which is adapted for welding to a test member.

Strain gages of the resistance wire type have been in use for some time for measuring variable quantities such as strain, pressure, torque, acceleration and temperature. The typical resistance wire strain gage contains a resistance wire connected in a conventional four-arm bridge circuit which ordinarily is balanced. The force to be measured is coupled mechanically to the resistance wire by various means, such that the force exerted on the wire through the coupling means causes the dimensions of the wire to be altered, which results in a proportional change in the resistance of the wire. This in turn causes unbalancing of the bridge in an amount at least roughly proportional to the force applied to the wire.

The present invention is summarized in that a weldable strain gage comprises a strain-responsive carbon filament mechanically coupled to a strain-deformable housing.

It is an object of the present invention to provide a weldable strain gage having a strain-responsive carbon filament for use at relatively high temperatures.

It is a further object of the present invention to provide a weldable strain gage having a strain-responsive carbon filament for use at ambient temperatures.

It is a further object of the present invention to provide a weldable strain gage having a strain-responsive carbon filament wherein the coupling between the strain-responsive carbon filament and the strain-deformable housing is mechanical, or adhesive, or both mechanical and adhesive.

DESCRIPTION OF THE PREFERRED EMBODIMENT

Figure 1:
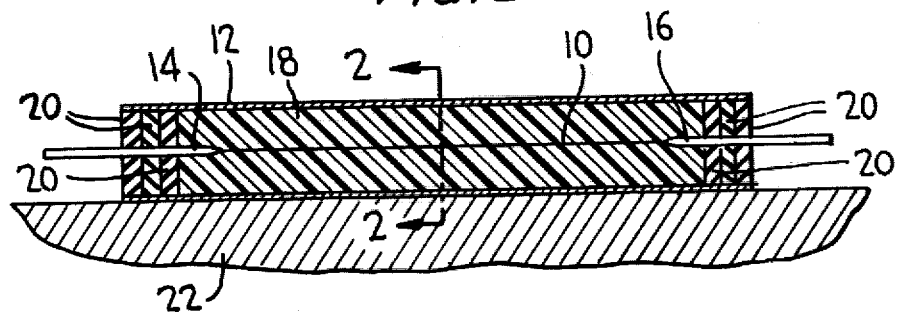
FIG. 1 is a longitudinal sectional view of a strain gage made according to the present invention.
Figure 2:
FIG. 2 is a sectional view taken along lines 2—2 of FIG. 1.

The basic embodiment of the strain gage which is the subject of the present invention is illustrated in FIGS. 1 and 2. Strain gages of this type are characterized by the feature of being weldably attachable to the test member along the entire effective length of the strain-responsive filament contained within the strain-deformable housing. As illustrated in FIGS. 1 and 2, the strain gage comprises a strain-responsive carbon strand filament 10 coaxially disposed in an elongated metal tubular housing 12 with the ends of the carbon filament 10 terminating within the housing 12. A pair of larger lead wires 14 and 16 are attached to carbon filament 10 and extend coaxially beyond the respective ends of housing 12. The free ends of lead wires 14 and 16 are adapted to be connected to a conventional bridge circuit or other electrical measuring circuit as is well known in the art.

A suitable mass of solid insulating material (or insulating cement as described below) 18 is disposed within housing 12 surrounding the carbon filament 10. In strain gages designed for relatively high temperature applications, the insulating material 18 can be a compactable and compressible mass of solid insulating material such as mica, aluminum oxide, thorium oxide, magnesium oxide, magnesium silicate, forsterite ($2MgO_2$), or any of the insulating plastics which are substantially stable at relatively high temperatures, such as, for example, polymerized tetra-fluoro-ethylene. If it is needed, two or more insulating materials having different temperature coefficients of expansion may be combined in proper proportions to give a desired composite temperature coefficient of expansion which approximates that of the material forming the tubular housing 12. Insulating washers 20 are disposed over the lead wires 14 and 16 at the respective ends of the housing 12 to contain the insulating material 18 within housing 12.

After the insulating material 18 has been placed as tightly as possible around the filament 10 and also around at least a portion of the lead wires 14 and 16, and the insulating washers 20 are positioned at the ends of the housing 12, the housing 12 is drawn or crimped or otherwise deformed from its original diameter to a smaller diameter in order to compress the insulating material 18, thereby creating a mechanical pressure exerted on the washers 20, the insulating material 18 and the carbon filament 10 embedded therein. This mechanical pressure causes the carbon filament 10 to be clamped over its entire length and surface by the radial pressure of the compressed insulating material 18 surrounding it. The insulation 18 is in turn firmly coupled to the inside surface of the housing 12 by the compressive force exerted against the housing 12 by the insulating material. As a direct consequence of this arrangement any strain or movement of the housing 12 is mechanically coupled and transmitted through the compacted mass of insulating material 18 to the carbon filament 10. At the same time the carbon filament 10 is thermally and electrically insulated from the housing 12. Thus, if the housing 12 is welded to a test member 22 by spot welds (designated by X's in FIG. 1) or by a continuous weld the entire length thereof and in any event preferably longer than the carbon filament 10, and if a strain is then introduced in the test member 22 causing deformation therein and a change in its dimensions, the dimensions of the housing 12 will undergo a corresponding deformation which will be transmitted through the compressed insulation 18 to the strain-deformable carbon filament 10 affecting a proportionate change in the resistance of filament 10.

In still another embodiment of the invention useful for relatively low or ambient temperature measurements, the strain-deformable carbon filament 10 is embedded in a mass of insulating cement 18. The bonding insulation provides electrical insulation between the housing 12 and the carbon filament 10 and further binds or adhesively couples the carbon filament 10 to the housing 12 by an adhesive force. Any of the many commercially available insulating glues or cements may be used to provide this type of insulation bonding, such as, for example, Carbo-Insulate (trade name), Ducco (trade name), cellulose acetate or nitrate lacquers, or any of these substances in admixture with a suitable insulating filler material. The cement or glue is placed within the tubular housing 12 surrounding the carbon filament 10 in the same manner as the high temperature powdered insulating material described above, and in quantity sufficient to fill the entire space between the cabon filament 10 and the interior wall of housing 12. The bonding insulation is then permitted to set or dry with the result that the carbon filament 10 will be adhesively bonded to the housing 12 and electrically insulated therefrom by the insulating qualities of the bonding insulation.

In still another embodiment of the present invention, a weldable strain gage comprises a strain-responsive carbon filament surrounded by a combination of a mass of powdered insulating material and a mass of adhesive cement insulating material for an increased coupling between the carbon filament and the housing.

Figure 3:
FIG. 3 is an elevational view of a strain-responsive filament as disclosed by the present invention.

Referring now to FIG. 3 there is illustrated a strain-responsive carbon filament element 10, having attached leads 14 and 16, as disclosed by the present invention. The carbon filament is preferably a fine or small carbon strand. The leads 14 and 16 may be wire which is welded, soldered, plated or otherwise attached to the ends of the carbon filament 10. Alternatively, the lead wires 14 and 16 may be formed integrally with carbon filament 10 as by the use of deposit techniques to increase the size or amount of carbon at each end of the filament 10, and such integral carbon leads could also be plated with gold or other suitable material.

Strain gages constructed using carbon filaments according to the present invention are adaptable for use in multifilament gages such as two and four filament gages. Such multifilament gages are useful to provide temperature compensation and compensation for erroneous readings which could be introduced by differences in the changes in lead wire resistances at elevated temperatures.

Many modifications and variations of the present invention are possible in light of the above teachings. It is therefore to be understood that within the scope of the appended claims the invention may be practiced otherwise than as specifically described.

What is claimed is:

1. In a strain gage having a metallic, tubular strain-deformable housing member, a strain-responsive elongated filament the resistance of which varies in accordance with strains occurring longitudinally thereto, a mass of solid compactable electrical insulating material mechanically coupling said filament within said housing member for deformation in direct proportion to deformation of said housing member, and means connected to said filament capable of monitoring the resistance thereof, wherein said strain-responsive filament comprises a carbon strand.

2. The strain gage as claimed in claim 1 wherein said mass of solid compactable electrical insulating material for mechanically coupling said filament to said housing member is an adhesive insulating material substantially surrounding said filament for adhesively coupling said filament to said housing member.

3. The strain gage as claimed in claim 1 further comprising an adhesive bonding material disposed between said insulating material and said filament and between said insulating material and said housing member.

* * * * *